US009077690B2

(12) United States Patent
Yan (10) Patent No.: US 9,077,690 B2
(45) Date of Patent: Jul. 7, 2015

(54) PRESERVATION OF USER DATA PRIVACY IN A NETWORK

(75) Inventor: Zheng Yan, Espoo (FI)

(73) Assignee: Nokia Corporation, Espoo (FI)

( * ) Notice: Subject to any disclaimer, the term of this patent is extended or adjusted under 35 U.S.C. 154(b) by 189 days.

(21) Appl. No.: 13/514,022

(22) PCT Filed: Dec. 7, 2009

(86) PCT No.: PCT/IB2009/055561
§ 371 (c)(1),
(2), (4) Date: Jun. 5, 2012

(87) PCT Pub. No.: WO2011/070393
PCT Pub. Date: Jun. 16, 2011

(65) Prior Publication Data
US 2012/0239942 A1    Sep. 20, 2012

(51) Int. Cl.
| G06F 12/14 | (2006.01) |
| H04L 29/06 | (2006.01) |
| G06F 21/62 | (2013.01) |
| H04W 8/24 | (2009.01) |
| H04W 8/18 | (2009.01) |

(52) U.S. Cl.
CPC ........ *H04L 63/0421* (2013.01); *G06F 21/6254* (2013.01); *H04W 8/24* (2013.01); *H04W 8/18* (2013.01)

(58) Field of Classification Search
None
See application file for complete search history.

(56) References Cited

U.S. PATENT DOCUMENTS

| 6,275,824 B1 | 8/2001 | O'Flaherty et al. |
| 6,480,850 B1 | 11/2002 | Veldhuisen |
| 8,112,422 B2 * | 2/2012 | Srivastava et al. ............ 707/737 |
| 8,347,101 B2 * | 1/2013 | Wilson .......................... 713/180 |
| 8,364,969 B2 * | 1/2013 | King ............................. 713/182 |

(Continued)

FOREIGN PATENT DOCUMENTS

| EP | 2017767 A1 | 1/2009 |
| EP | 2124166 A1 | 11/2009 |
| WO | 2008/086611 A1 | 7/2008 |

OTHER PUBLICATIONS

Yan et al., "Trust Indication's Influence on Mobile Application Usage—Comparison of Results Achieved in Finland and China", NRC-TR-2009-004, Aug. 25, 2009, pp. 1-49.

(Continued)

*Primary Examiner* — Jung Kim
*Assistant Examiner* — Janusz Kusyk
(74) *Attorney, Agent, or Firm* — Mintz Levin Cohn Ferris Glovsky and Popeo, P.C.

(57) ABSTRACT

An example apparatus is provided that receives a pseudonym and encrypted identifier, where the pseudonym is of a user's personal data. The pseudonym has been generated using a first secret key, and the encrypted identifier has been generated by encrypting the identifier using a second secret key. The first and second secret keys are known to other user(s) authorized to access the data, and are unknown to the apparatus. The operations also include storing the personal data in a database under the pseudonym, and indexed by the encrypted identifier. The keys used for encryption and pseudorandom generation can be provided by a second apparatus (e.g. an offline security manager), which may employ a proxy re-encryption scheme to provide proper keys to the apparatus based on access policies. Only the authorized users can decrypt the keys with their private keys, thus can query the user records stored in the apparatus.

18 Claims, 4 Drawing Sheets

(56) References Cited

U.S. PATENT DOCUMENTS

| | | |
|---|---|---|
| 2002/0099824 A1* | 7/2002 | Bender et al. ................. 709/225 |
| 2003/0039362 A1 | 2/2003 | Califano et al. |
| 2007/0035390 A1 | 2/2007 | Thomas et al. |
| 2007/0038680 A1 | 2/2007 | Casey |
| 2007/0250904 A1 | 10/2007 | Waller |
| 2008/0244721 A1* | 10/2008 | Barrus et al. ....................... 726/9 |
| 2009/0265788 A1* | 10/2009 | Ehrenschwender et al. .... 726/26 |
| 2009/0300351 A1 | 12/2009 | Lei et al. |
| 2010/0191975 A1* | 7/2010 | Chase et al. ................. 713/176 |
| 2011/0010563 A1* | 1/2011 | Lee et al. ....................... 713/189 |
| 2011/0112970 A1* | 5/2011 | Yu ................................... 705/51 |

OTHER PUBLICATIONS

Blaze et al., "Divertible Protocols and Atomic Proxy Cryptography", Advances in Cryptology—Eurocrypt, Lecture Notes in Computer Science, vol. 1403, 1998, 18 pages.

Ateniese et al., "Improved Proxy Re-Encryption Schemes With Applications to Secure Distributed Storage", Proceedings of the 12th Annual Network and Distributed System Security Symposium, Feb. 2005, pp. 1-25.

International Search Report and Written Opinion received for corresponding International Patent Application No. PCT/IB2009/055561, dated Sep. 10, 2010, 15 pages.

* cited by examiner

PRESERVATION OF USER DATA PRIVACY IN A NETWORK

RELATED APPLICATION

This application was originally filed as PCT Application No. PCT/IB2009/055561 filed Dec. 07, 2009.

TECHNICAL FIELD

Example embodiments of the present invention generally relate to storing personal data of a user in a network and, more particularly, relate to an apparatus and method for preserving the privacy of stored personal data of a user in a network.

BACKGROUND

Mobile devices are often considered important personal devices for communications, business and entertainment. They can collect various data or information related to their users, such as location, mobile application usage information, communication statistics, device connectivity status, web service access statistics, as well as user personal activities or the like. Meanwhile, a number of online services have developed that attempt to collect the mobile users' personal data in order to provide desired services, and more particularly personalized mobile services based on user data mining.

For example, mobile user location-based services have shown business potential. A reputation service may provide personalized recommendations on downloadable software (e.g., mobile) applications based on widely-collected user feedback and software/application usage statistics. These and other similar types of services generally apply a centralized service center to collect users' personal data from their mobile phones and then offer services based on the collected data. This service center may be deployed over a wide area network such as the Internet and may be susceptible to various internal and external attacks.

In practice, users may be hesitant to share their personal data to the service center of a service provider located in an insecure network. Privacy is often cited as a main concern for this hesitation. Firstly, a service center may suffer an internal or external attack in which a user's personal data may be accessed by unauthorized individuals. Secondly, even if the service center is properly running, some personal data may be derivable from accessible data records stored in a database of service center.

BRIEF SUMMARY

In view of the foregoing background, example embodiments of the present invention are directed to an apparatus and method for preserving the privacy of user data at a service center or other apparatus in order to overcome database reading attacks and user data tracking attacks. Example embodiments of the present invention may reduce if not prevent the service center from learning or tracking information about user data records maintained in a database of the service center. Information that may be used to link any two user records associated with the same user may be concealed using pseudonyms and/or encrypted with a random initialization vector. In accordance with example embodiments of the present invention, independent secret keys (for pseudonym generation and encryption) may be assigned to authorized users such as to satisfy advanced and dynamic traceability requirements, which may allow for efficient key management and privilege revocation using proxy re-encryption techniques.

Example embodiments of the present invention may be backward compatible with existing communication protocols and database schemas of a service center, and may not impose any extra requirements on the physical infrastructure. Further, example embodiments of the present invention may employ a security manager in a manner that may reduce cost compared with an online security manager that may also be more cumbersome for users.

According to one aspect of example embodiments of the present invention, an apparatus is provided that includes a processor and a memory storing executable instructions that in response to execution by the processor cause the apparatus to at least perform a number of operations. The operations include receiving a pseudonym and encrypted identifier at an apparatus (e.g., service center), where the pseudonym is of personal data of a user having a unique identifier. The pseudonym has been generated using a first secret key, and the encrypted identifier has been generated by encrypting the identifier using a second secret key. The first and second secret keys are known to other user(s) authorized to access the data, and are unknown to the apparatus. The operations also include storing the personal data in a database under the pseudonym, and indexed by the encrypted identifier. The personal data may then be retrieved by authorized user(s) querying the database based on the pseudonym and encrypted identifier.

More particularly, the memory may store executable instructions that in response to execution by the processor cause the apparatus to further perform receiving a query for the personal data from an authorized user, where the query includes the pseudonym and encrypted identifier both having been generated by the authorized user. The operations may then include retrieving the personal data from the database based on the pseudonym and encrypted identifier, and preparing the personal data for transmission to the authorized user.

A respective pseudonym and encrypted identifier may be received for a plurality of users. In such instances, the personal data may be stored in the database under the respective pseudonyms, and indexed by the respective encrypted identifiers. Also in such instances, the query may comprise a query for the personal data of some of the users, and may include the pseudonyms and encrypted identifiers of the respective users. According to another aspect of example embodiments of the present invention, an apparatus is provided comprising a processor and a memory storing executable instructions that in response to execution by the processor cause the apparatus to at least generate a pseudonym of personal data of a user using a first secret key and encrypt a unique identifier of the user using a second secret key. The apparatus of this embodiment is configured to prepare the pseudonym and encrypted identifier for transmission to a remote apparatus for storage of the personal data in a database under the pseudonym, and indexed by the encrypted identifier. The first and second secret keys are known to one or more other users authorized to access the data, but are unknown to the remote apparatus.

According to a further aspect of example embodiments of the present invention, the apparatus (e.g., service center) may comprise a processor and a memory storing executable instructions that in response to execution by the processor cause the apparatus to further perform a number of operations. These operations may include receiving encrypted first and second secret keys that have been generated by encrypting the first and second secret keys using a public key of a second apparatus (e.g., security manager). The additional operations may also include creating a re-encryption key that has been generated using a public key of the authorized user and the public key and a private key of the second apparatus (e.g. security manager), and re-encrypting the encrypted first and second secret keys using the re-encryption key in order to make it decryptable by the authorized user's private key. And the additional operations may include preparing the re-encrypted first and second secret keys for transmission to the authorized user, where the authorized user is configured to decrypt the re-encrypted keys using the private key of the authorized user to thereby obtain the first and second secret keys.

Further operations that the apparatus may be configured to perform include receiving an access control policy (e.g. from the second apparatus) granting the one or more authorized users access to the personal data. Generating the re-encrypted first and second secret keys and preparing this cipher text for transmission, then, may occur in accordance with the access control policy.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like. For instance, example embodiments of the present invention may be shown and described herein in the context of ad-hoc networks; but it should be understood that example embodiments of the present invention may be equally applied in other types of distributed networks, such as grid computing, pervasive computing, ubiquitous computing, peer-to-peer, cloud computing for Web service or the like.

The terms "data", "content", "information" and similar terms may be used interchangeably, according to some example embodiments of the present invention, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Figure 1:
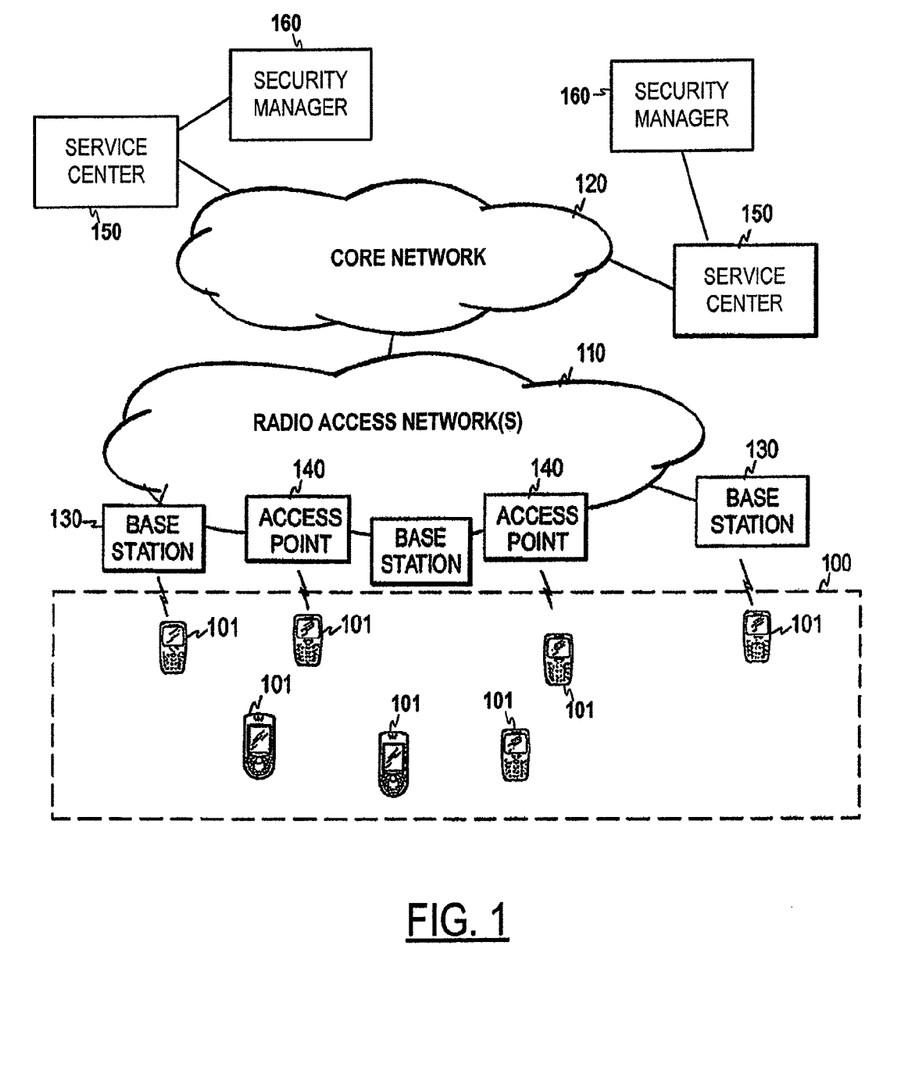
FIG. 1 illustrates a general communication environment according to example embodiments of the present invention.

FIG. 1 illustrates a general communication environment in which example embodiments of the present invention may be applied. The communication environment includes three interacting domains: a user equipment domain 100, an access domain including several radio access networks 110, and a backbone domain including a core network 120.

The above communication environment may include a mobile network and one or more short-range wireless networks, and may therefore include one or more base stations 130 (or node B elements), access points 140 or the like. Examples of these networks may include 3GPP radio access networks, Universal Mobile Telephone System (UMTS) radio access UTRAN (Universal Terrestrial Radio Access Network), Global System for Mobile Communications (GSM) radio access networks, Code Division Multiple Access (CDMA) 2000 radio access networks, Wireless Local Area Networks (WLANs) such as IEEE 802.xx networks (e.g., 802.11a, 802.11b, 802.11g, 802.11n, etc.), world interoperability for microwave access (WiMAX) networks, IEEE 802.16, and/or wireless Personal Area Networks (WPANs) such as IEEE 802.15, Bluetooth, low power versions of Bluetooth, infrared (IrDA), ultra wideband (UWB), Wibree, Zigbee or the like. 3GPP radio access networks may include, for example, 3G or 3.9G (also referred to as UTRAN Long Term Evolution (LTE) or Super 3G) or E-UTRAN (Evolved UTRAN) networks. Generally, a radio access network may refer to any 2G, 3G, 4G or higher generation mobile communication network and their different versions, radio frequency (RF) or any of a number of different wireless networks, as well as to any other wireless radio access network that may be arranged to interwork with such networks.

The user equipment domain 100 may include a plurality of mobile terminals 101. In this context, the terminals may be multimode terminals. A multimode terminal here refers to a terminal that has at least two operation modes, i.e., at least two radio interfaces based on different connectivity standards. Although one operation mode may be provided for communicating with the mobile network, the terminal may also be provided with one or more other operation modes, in which a short-range radio of the terminal may be active. The terminals may have different states with respect to each operation mode, and the states allowed concurrently depend on the implementation of the terminal.

Although not particularly shown in FIG. 1, the mobile terminals 101 may also form ad-hoc networks in which the terminals may communicate directly or indirectly with each other, such as in accordance with various ones of the above manners by which the radio access networks may be configured to communicate. In such instances, an ad-hoc network may include a trunk node configured to communicate with a base station 130 or access point 140 of the radio access network, and configured to communicate with at least one other ad-hoc node for which the trunk node acts as an access point or gateway. The other nodes may be located at different distances from the trunk node, measured as the number of hops between the node and the trunk node. That is, the trunk node does not have to have a direct connection to each of the other nodes. In such instances, messages between the trunk node and an ad-hoc node may be further than one hop apart from the trunk node and may be relayed by one or more intermediate ad-hoc nodes. Therefore, inside a sub-network served by a trunk node, a connection may involve the end nodes and one or more intermediate nodes. The ad-hoc nodes may also form different sub-networks. The trunk node may also serve more than one ad-hoc network, and with different radio interfaces. In addition to mobile terminals, an ad-hoc network may also include one or more wireless routers, which may also assume the responsibilities of a trunk node. The wireless routers may also be located in the access domain, in which case the ad-hoc networks may penetrate into the access domain.

The radio access network 110 and/or core network 120 may further be connected to one or more external networks, such as the Internet. The core network and/or the external network (and/or one or more ad-hoc networks) may include one or more service providers that may operate corresponding service centers 150 to provide respective services to other apparatuses such as the mobile terminals 101. And in accordance with example embodiments of the present invention, one or more of these service centers may be connected to or otherwise configured to communicate with one or more security managers 160. As shown, the security managers are offline from the core network and may be further offline from the external network, although it should be understood that the security managers in various instances may alternatively be connected to the core network and/or the external network.

In accordance with example embodiments of the present invention, the services provided by the service providers may include those that rely on or otherwise employ personal data of users of the other apparatuses. Examples of these services may include location-based services that may rely on or otherwise employ an indication of the location of the apparatuses receiving the services, reputation services that may rely on or otherwise employ user feedback and software/application usage statistics to provide personalized recommendations on downloadable software (e.g., mobile) applications, or the like. The services provided by the service providers and the underlying personal data are accessible by authorized users, but are generally inaccessible for unauthorized users. Authorized users may be users of the mobile terminals 101 or other parties located in the core network 120 or elsewhere.

Figure 2:
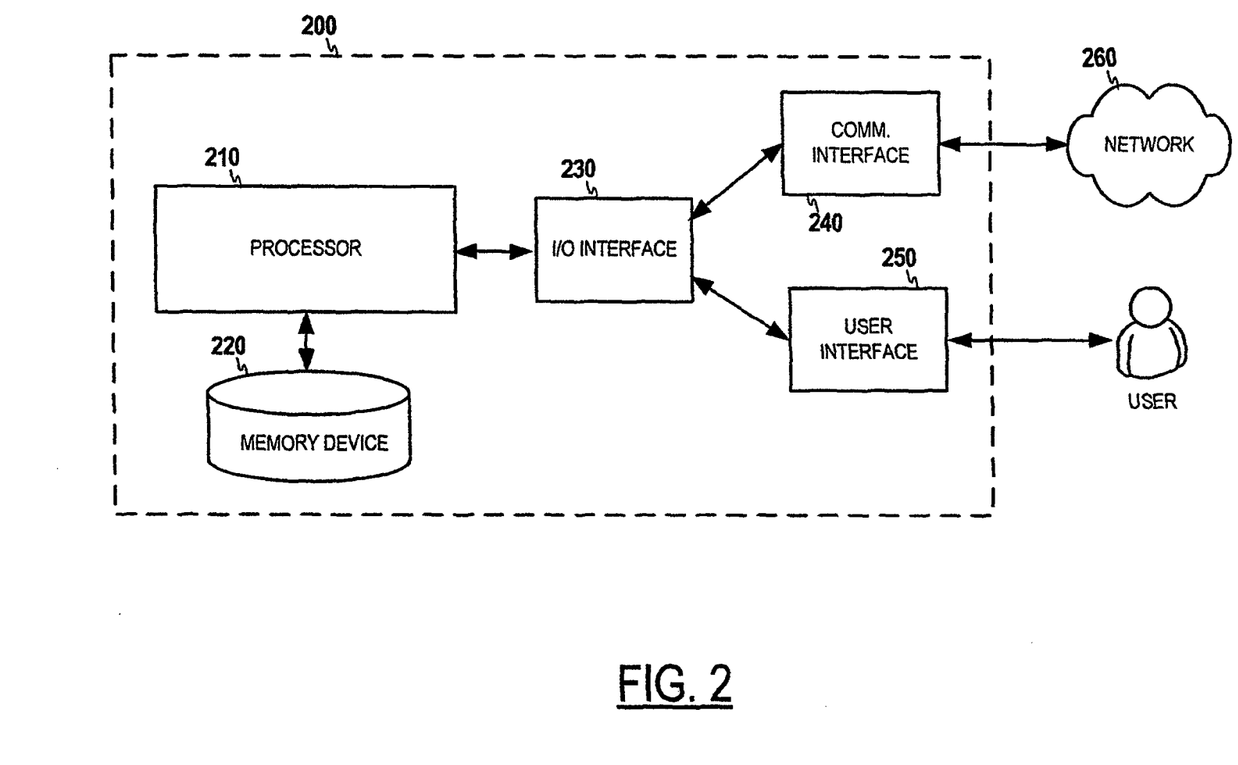
FIG. 2 illustrates an apparatus that may be configured to operate within the network architecture of FIG. 1, according to various example embodiments of the present invention.

Reference is now made to FIG. 2, which illustrates an apparatus 200 according to example embodiments of the present invention configured to perform the various functionalities described herein. As shown and described herein, the example apparatus may be configured to function as or otherwise implement one or more of the network components depicted in FIG. 1 (e.g., mobile terminal 101 including, e.g., an authorized user, base station 130, access point 140, service center 150, security manager 160, etc.)—and may at times be referenced by the users of the respective components. The example apparatus depicted in FIG. 2 may also be configured to perform example methods of the present invention, such as those described with respect to FIG. 4.

In some example embodiments, the apparatus 200 may, be embodied as, or included as a component of, a communications device with wired or wireless communications capabilities. In this regard, the apparatus may be configured to operate in accordance with the functionality of one or more network elements as described herein. The example apparatus may include or otherwise be in communication with one or more processors 210, memory devices 220, Input/Output (I/O) interfaces 230, communications interfaces 240 and/or user interfaces 250 (one of each being shown). The processor may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, the processor may be representative of a plurality of processors, or one or more multiple core processors, operating in concert. Further, the processor may be comprised of a plurality of transistors, logic gates, a clock (e.g., oscillator), other circuitry, and the like to facilitate performance of the functionality described herein. The processor may, but need not, include one or more accompanying digital signal processors. In some example embodiments, the processor is configured to execute instructions stored in the memory device or instructions otherwise accessible to the processor. The processor may be configured to operate such that the processor causes the apparatus to perform various functionalities described herein.

Whether configured as hardware or via instructions stored on a computer-readable storage medium, or by a combination thereof, the processor 210 may be an entity capable of performing operations according to embodiments of the present invention while configured accordingly. Thus, in example embodiments where the processor is embodied as, or is part of, an ASIC, FPGA, or the like, the processor is specifically configured hardware for conducting the operations described herein. Alternatively, in example embodiments where the processor is embodied as an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 220 may be one or more computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 210.

Further, the memory device 220 may be configured to store information, data, applications, computer-readable program code instructions, and/or the like for enabling the processor 210 and the example apparatus 200 to carry out various functions in accordance with example embodiments of the present invention described herein. For example, the memory device may be configured to buffer input data for processing by the processor. Additionally, or alternatively, the memory device may be configured to store instructions for execution by the processor. The memory may be securely protected, with the integrity of the data stored therein being ensured. In this regard, data access may be checked with authentication and authorized based on access control policies.

The I/O interface 230 may be any device, circuitry, or means embodied in hardware, software or a combination of hardware and software that is configured to interface the processor 210 with other circuitry or devices, such as the communications interface 240 and/or the user interface 250. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 200 to perform, various functionalities of the present invention.

The communication interface 240 may be any device or means embodied in hardware, software or a combination of hardware and software that is configured to receive and/or transmit data from/to one or more networks 260 (e.g., radio access networks 110, core networks 120, etc.) and/or any other device or module (e.g., other similar apparatuses such as to form an ad-hoc network 103) in communication with the example apparatus 200. The processor 210 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 240 may be configured to provide for communications in accordance with any of a number of wired or wireless communication standards. The communications interface may be configured to support communications in multiple antenna environments, such as multiple input multiple output (MIMO) environments. Further, the communications interface may be configured to support orthogonal frequency division multiplexed (OFDM) signaling. In some example embodiments, the communications interface may be configured to communicate in accordance with various techniques including, as explained above, any of a number of 2G, 3G, 4G or higher generation mobile communication technologies, radio frequency (RF), IrDA or any of a number of different wireless networking techniques. The communications interface may also be configured to support communications at the network layer, possibly via Internet Protocol (IP).

The user interface 250 may be in communication with the processor 210 to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device 220). In some example embodiments, the user interface circuitry is configured to facilitate user control of at least some functions of the apparatus 200 through the use of a display and configured to respond to user inputs. The processor may also comprise, or be in communication with, display circuitry configured to display at least a portion of a user interface, the display and the display circuitry configured to facilitate user control of at least some functions of apparatus.

Example embodiments of the present invention are directed to reducing if not eliminating tracking of information from a database (in memory) at a service center 150. This may be accomplished by hiding one or more fields in user data records to prevent grouping and correlating those records associated to the same underlying user identity. Examples of this underlying or real or actual identity or identifier (ID) may include a Mobile Station International Subscriber Directory Number (MSISDN), International Mobile Subscriber Identity (IMSI), International Mobile Equipment Identity (IMEI), Internet identifier (e.g. IM, email or social networking identifier) or any of a number of other identifiers by which a respective apparatus may be accessed independent of the respective service provider.

Information that may be used to link any two user records associated with the same user may be concealed using pseudonyms and/or encryption with a random initialization vector. More particularly, example embodiments of the present invention may employ encryption with a random initialization vector to generate encrypted identifiers (IDs) for users that may be used instead of the users' respective real or actual ID to index user records stored in the database of the service center. Though corresponding to the same user, unlike a real user ID, encryption with the random initialization vector generated for the same user may appear differently.

In addition to or in lieu of encryption with random initialization vector, a keyed pseudorandom function may be implemented to hide or otherwise conceal the real or actual data in a user's data record, such as the user's location, usage statistics, communication records, connectivity history or the like.

Keys used for the encryption and pseudonym generation may be provided by a security manager, which may employ a proxy re-encryption technique to provide proper keys to the service center 150 based on access policies (where the service center may itself be prevented from revealing the keys). The service center may behave as a proxy that forwards the re-encrypted keys to the authorized users, thus the security manager is not necessary to be always on-line, thereby potentially saving system operation cost. The system may be arranged such that only authorized parties may decrypt the keys with their private keys; and thus, that such authorized parties may be the only ones enabled to query the otherwise hidden real or actual data in the user's data record stored in the service center's database.

Figure 3:
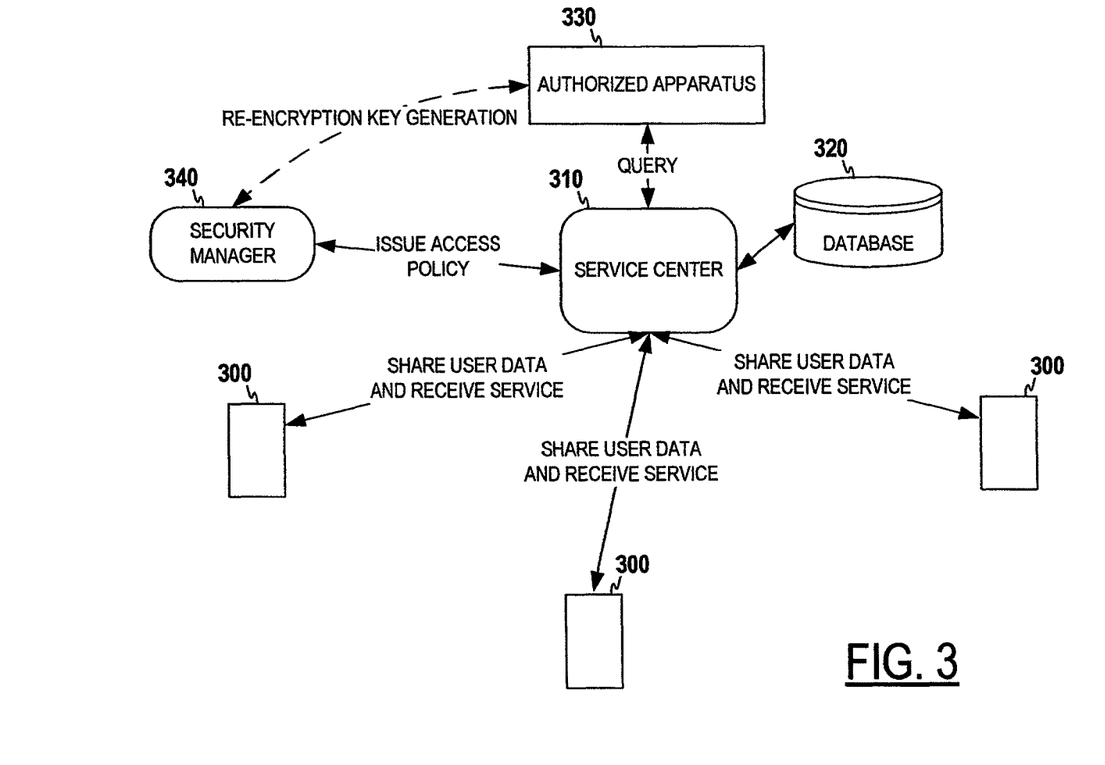
FIG. 3 illustrates a functional block diagram of mobile terminals interacting with a service center of a service provider according to example embodiments of the present invention.

Reference is now made to FIG. 3 which illustrates a functional block diagram of mobile terminals 300 interacting with a service center 310 of a service provider according to example embodiments of the present invention. As shown, the service center includes or is otherwise in communication with a database 320 configured to store data records for the mobile terminal users, where the data records may store personal data of the users for use in providing a service to the users. In this regard, the mobile terminal users (via their terminals) may share their personal data with the service center, which may save this data in its database. According to example embodiments of the present invention, however, this personal data may be stored in the database such that the personal data is accessible to an authorized user's apparatus 330 but hidden or otherwise concealed from an unauthorized user. An apparatus that may attempt to access the personal data, and that may be authorized to do so may include, for example, a mobile terminal 300 (including the apparatus of the user whose personal data is being accessed), an apparatus of the respective service provider for providing its service (e.g., an apparatus 200) in concert with a service center, or the like. A security manager 340, which may be offline from a core network and external network (e.g., the Internet) may be configured to generate re-encryption keys for those authorized apparatuses, who may be enabled to query and access the service center's database to access the real user data based on one or more access policies. A mobile terminal user whose data is stored may also specify one or more access polices regarding the user's respective personal data and pass the policies to the security manager.

Example embodiments of the present invention may implement any of a number of different pseudorandom functions F(:; :) to generate pseudonyms under which one or more real user data elements may be stored in a data record in the database 320 of the service center 310. For example, a hash function such as a keyed hash message authentication code (HMAC) may be applied to generate pseudonyms, e.g., pseudonym=F(secret key, real data record elements).

Any of a number of encryption algorithms E(:; :) to generate encrypted user IDs for indexing user records stored in the database 320 of the service center 310. For example, a chosen-plaintext attack (CPA)-secure symmetric encryption technique may be implemented, such as an advanced encryption standard (AES) in cipher block chaining (CBC) mode with a random initialization vector (AES-CBC). A CPA-secure encryption technique introduces randomness in the cipher text so that the same plaintext will not produce the same cipher text when encrypted twice using the same key. As a result, an unauthorized apparatus may not be able to link any two user records associated with the same user but labeled by different cipher texts of the same user identifier.

In accordance with example embodiments of the present invention, the same or different secret keys may be used for different cryptographic operations. In the case of using different secret keys, a user may use one secret key for pseudonym generation and another secret key for encryption. On the other hand, a user may use one secret key for both pseudonym generation and encryption with random initialization. In either instance, a proxy re-encryption technique may be implemented in which the security manager 340 may be configured to issue proper key(s) to authorized apparatuses (sometimes referenced by their respective authorized users). Proxy re-encryption may allow a proxy to transform a cipher text computed under the public key of an apparatus A into one that can be decrypted using the private key of another apparatus B. During cipher text transformation, referred to as re-encryption, the proxy may learn nothing about the underlying plaintext.

A proxy re-encryption technique according to example embodiments of the present invention may be represented as a tuple of (possibly probabilistic) polynomial time algorithms (KG; RG; E; R; D):

(KG; E; D) may represent standard key generation, encryption and decryption algorithms for an underlying public key encryption technique. On input of a security parameter $1^k$ for an apparatus A, key generation algorithm KG is configured to output a public and private key pair (pk_A; sk_A). On input of the public key pk_A and a message m, the encryption algorithm E is configured to output a cipher text C_A=E(pk_A; m). And on input of the private key sk_A and cipher text C_A, decryption algorithm D is configured to output the message m=D (sk_A; C_A).

On input of the key pair for apparatus A and a public key for an apparatus B (pk_A; sk_A; pk_B), a re-encryption key generation algorithm RG may be configured to output a re-encryption key rk_A→B for a proxy.

On input of rk_A→B and cipher text C_A, a re-encryption function R(rk_A→B; C_A) may be configured to output E(pk_B; m)=C B, which may be decrypted using private key sk_B.

Each of the security manager 340 as well as the mobile terminals 300 and authorized apparatus 330 may have a public and private key pair under the public key encryption technique (KG; E; D). Let (pk_SM; sk_SM) denote the public and private key pair of the security manager, and (pk_u; sk_u) denote the public and private key pair of an authorized user u. The security manager may be configured to operate as follows for managing keys and controlling access to the database 320 of the service center 310. The security manager, on input (pk_SM; sk_SM; pk_u) to the re-encryption key generation algorithm RG, may be configured to generate the re-encryption key rk_SM→u for the apparatus u. The security manager may then be configured to forward rk_SM→u and applicable access control policies to the service center.

A mobile terminal user p may operate its mobile terminal 300 to encrypt its secret key k_p using the public key of the security manager to obtain E(pk_SM; k_p), and publish the encrypted secret key along with the preserved user's data records to the service center 310 for storage in the service center's database 320. When an authorized user u is allowed to access the user's data records, the service center may be configured to compute (based on access control policies) R(rk_SM→u; E(pk_SM; k_p))=E (pk_u; k_p) and transmit it to the authorized user u. The authorized user's apparatus may be configured to decrypt E(pk_u; k_p) using its private key sk_u to obtain k_p, which may then be used to query the database. In this example embodiment, the service center may function as the proxy in the proxy re-encryption technique in which the service center indirectly distributes secret keys of mobile terminal users to authorized users' apparatuses while without the service center itself learning anything about the respective secret keys. Note that access polices may be also defined by mobile terminal users and sent to the service center and/or the security manager. Thus, personalized private data protection may be implemented.

Figure 4:
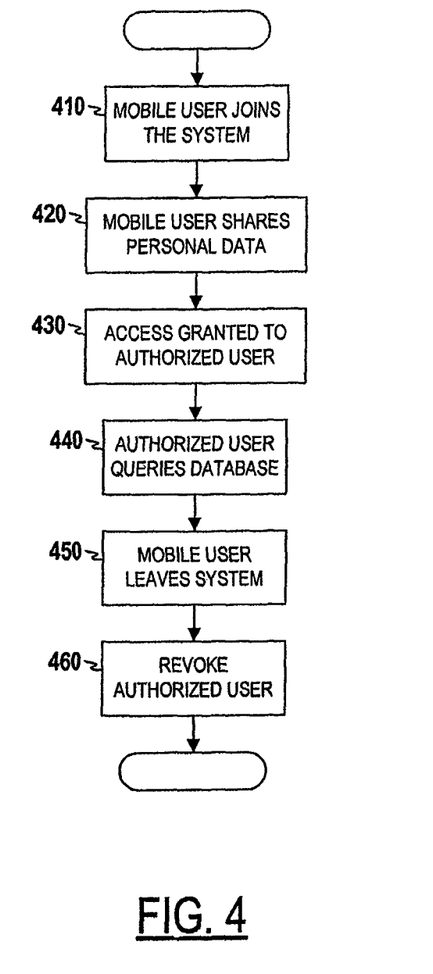
FIG. 4 illustrates a flowchart including various operations in a method of example embodiments of the present invention.

Reference is now made to FIG. 4, which illustrates a flowchart including various operations in a method of example embodiments of the present invention. As shown at block 410, the method may include a mobile user p joining the system or otherwise supplying personal data to the service center of a service provider to receive a service of the respective provider. At this stage, the user's mobile terminal 300 may generate or otherwise receive a random secret key k_p, and receive the public key pk_SM of the security manager. The mobile terminal may then encrypt its secret key E(pk_SM; k_p) and send it to the security manager 340, and may additionally update the control policies policy(u) for an authorized user and forward the policies to the security manager. The security manager may update access control policy Policy(u) for all affected users and forwards them to the service center. In this regard, the access control policies may, for example, be represented as follows: policy(u)={<u; data_p, day_i; granted>|p ∈P}, where P represents a set of one or more mobile users whose data records are allowed access by the apparatus 330 of an authorized user u, and day_i represents the date of allowed access.

Before, after or as user p's mobile terminal 300 forwards its encrypted secret key and access control policies to the security manager 340, the mobile terminal may send user personal data x to the service center, share(p; x), as shown at block 420. According to example embodiments of the present invention, the mobile terminal may generate a pseudonym of data x, i.e., pn_x=F(k_p; x); and may encrypt a real or actual ID l_p of user p, i.e., et i=E(k_p; l_p). The data pseudonym and encrypted ID may then be published to the service center. More particularly, the data pseudonym and encrypted ID may be sent to the service center for storage of the personal data under the pseudonym in a data record for the user, where the data record may be indexed by the encrypted ID.

Before, after or as the mobile terminal 300 sends its user's data pseudonym and encrypted ID to the service center 310, access rights to an authorized user u may be granted, as shown at block 430. This may include the authorized user's apparatus 330 generating or otherwise receive a public key and private key pair (pk_u; sk_u)=KG($1^k$). The security manager 340 may generate a re-encryption key rk_SM→u=RG (pk_SM; sk_SM; pk_u), and send it and access control policies policy(u) for the authorized user to the service center. During repeated implementation of the method, generation of the key pair and re-encryption key may be skipped when the values of (pk_u, sk_u) and (pk_SM, sk_SM) remain unchanged.

The authorized user u may (via its apparatus 330) request a transformed cipher text of the secret key k_p of mobile user p. In response, the service center 310 may check the access control policies for the authorized user policy(u) and transform E(pk_SM; k_p) into E(pk_u; k_p) when the policies authorize the user u to access user p's data records: R(rk_SM→u; E(pk_SM; k_p))=E(pk_u; k_p). The authorized user u may then receive user p's encrypted secret key E(pk_u; k_p) and decrypt it using the authorized user's private key to obtain user p's secret key, k_p=D(sk_u; E(pk_u; k_p)).

After access is granted to the authorized user u, the user may operate its apparatus 330 to query the database 320 of the service center 310 to acquire personal data x of user p, as shown at block 440. In this instance, user p ∈ P (i.e., set of one or more mobile users whose data records are allowed access by the authorized user u), and the authorized user has a privilege prlg(u) where k_p ∈ prlg(u). The authorized user, then, may calculate user p's data pseudonym and encrypted ID and send them in a query to the service center for accessing records in its database 320. In other instances the authorized user may desire to query the service center for personal data x of all users p of the set of users whose data records are allowed access, i.e., P. In this instance, the authorized user may implement a routine that includes initially setting a set of data pseudonyms PN=Ø (empty set) and encrypted IDs ET=Ø. Then, for each mobile user p ∈ P and k_p " prlg(u), the authorized user may calculate pn_x=F(k_p; x) and PN=PN ∪pn_x; and may calculate et i=E(k_p; l_p) and ET=ET∪et_i. The authorized user may then send PN and ET to the service center.

In the database 320 of the service center 310, user p's personal data x may be stored under its pseudonym pn_x in a data record for user p, where the data record may be indexed by user p's encrypted ID et i. Thus, in response to the query and utilizing the pseudonyms (pn_x or PN) and encrypted IDs (et_i or ET), the service center may retrieve from its database 320 the requested data x, which may then be sent to the authorized user's apparatus 330 in response to the query.

As also shown in FIG. 4, and in particular at blocks 450 and 460, at any time a mobile terminal user p may leave the system such that its personal data may no longer be accessible by any authorized user, or the granted access to one or more authorized users may be revoked. In these instances, the security manager 340 may be notified of the change. If a user p leaving the system, the security manager may update the access control policies policy(u) for all affected authorized users u, and send the updated access control policies to the service center 310. If an authorized user u's access rights are revoked, on the other hand, the security manager may direct the service center to remove that user's policies policy(u).

According to example embodiments of the present invention, user personal data may be hidden or otherwise concealed at a service provider's service center 310. Tracking user data, then, may include keys provided by a security manager 340 to the service center; may be based on access policies. These keys may not be revealed by the service center itself. And the authorized users may be the only ones enabled to decrypt the keys with their private keys, and may thus be enabled to query the real user records stored in the service center's database 320.

According to one aspect of the example embodiments of present invention, the functions performed by the apparatus 200, such as those illustrated by the flowchart of FIG. 4, may be performed by various means. It will be understood that each block or operation of the flowchart, and/or combinations of blocks or operations in the flowchart, can be implemented by various means. Means for implementing the blocks or operations of the flowchart, combinations of the blocks or operations in the flowchart, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as the memory device 220 of the example apparatus, and executed by a processor, such as the processor 210 of the example apparatus. As will be appreciated, any such program code instructions may be loaded onto a computer or other programmable apparatus (e.g., processor, memory device, or the like) from a computer-readable storage medium to produce a particular machine, such that the particular machine becomes a means for implementing the functions specified in the flowchart's block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowchart's block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowchart's block(s) or operation(s).

Accordingly, execution of instructions associated with the blocks or operations of the flowchart by a processor, or storage of instructions associated with the blocks or operations of the flowchart in a computer-readable storage medium, supports combinations of operations for performing the specified functions. It will also be understood that one or more blocks or operations of the flowchart, and combinations of blocks or operations in the flowchart, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
at least one processor; and
at least one memory including computer program code configured to, with the at least one processor, cause the apparatus to perform at least the following:
generate a pseudonym of personal data of a user using a first secret key;
encrypt a unique identifier of the user using a second secret key;
prepare the pseudonym and the encrypted unique identifier for transmission to a remote apparatus for storage of the personal data in a database under the pseudonym, the personal data indexed by the encrypted unique identifier, the first and second secret keys being known to one or more other users authorized to access the personal data, and the first and second secret keys being unknown to the remote apparatus; and
prepare an access control policy for transmission to a second apparatus, the access control policy grants the one or more other users authorization to access the personal data.

2. The apparatus of claim 1, wherein the apparatus is further configured to at least generate a pseudonym of the personal data by at least applying a hash function to the personal data using the second secret key.

3. The apparatus of claim 1, wherein the apparatus is further configured to at least encrypt the identifier by at least encrypting the identifier according to a chosen-plaintext attack-secure symmetric encryption technique.

4. The apparatus of claim 1, wherein the apparatus comprises a first apparatus, and wherein the apparatus is further configured to at least:
receive a public key of the second apparatus distinct from the first apparatus;
encrypt the first and second secret keys using the public key of the second apparatus; and
prepare the encrypted first and second secret keys for transmission to the second apparatus for generating and transmitting to an authorized user re-encrypted first and second secret keys that have been re-encrypted using a re-encryption key that has been generated using a public key of an authorized user and the public key and a private key of the second apparatus.

5. The apparatus of claim 4, wherein the
access control policy for transmission to the second apparatus is for generating and transmitting to the authorized user the re-encrypted keys in accordance with the access control policy.

6. An apparatus comprising:
at least one processor; and
at least one memory including computer program code configured to, with the at least one processor, cause the apparatus to perform at least the following:
receive a pseudonym and an encrypted identifier at the apparatus, the pseudonym being of personal data of a user having a unique identifier, the pseudonym having been generated using a first secret key, and the encrypted identifier having been generated by at least encrypting the identifier using a second secret key, the first and second secret keys being known to one or more other users authorized to access the data, and the first and second secret keys being unknown to the apparatus;
receive an access control policy for transmission to a second apparatus, the access control policy grants the one or more other users authorization to access the personal data; and
provide for storage of the personal data in a database under the pseudonym, the personal data indexed by the encrypted identifier.

7. The apparatus of claim 6, wherein the apparatus is further configured to at least:
receive a query for the personal data from an authorized user, the query includes the pseudonym and the encrypted identifier both having been generated by the authorized user;
retrieve the personal data from the database based on the pseudonym and the encrypted identifier; and
prepare the personal data for transmission to the authorized user.

8. The apparatus of claim 7, wherein the apparatus is further configured to at least receive the pseudonym and the encrypted identifier by at least receiving the pseudonym and the encrypted identifier for a plurality of users, wherein the provide for storage of the personal data comprises provide for storage of the personal data in the database under the respective pseudonyms,
wherein the receive a query comprises receive a query for the personal data of some of the users, the query includes the pseudonyms and encrypted identifiers of the respective users, all of the pseudonyms and encrypted identifiers having been generated by the authorized user.

9. An apparatus comprising:
at least one processor; and
at least one memory including computer program code configured to, with the at least one processor, cause the apparatus to perform at least the following:
receive encrypted first and second secret keys that have been generated by encrypting the first and second secret keys using a public key of the apparatus;
generate a re-encryption key using the public key of an authorized user and the public key and a private key of the apparatus;
generate the re-encrypted first and second secret keys using the re-encryption key; and
prepare the re-encrypted first and second secret keys for transmission to the authorized user for decrypting the re-encrypted first and second secret keys using the private key of the authorized user to thereby obtain the first and second secret keys;
receive an access control policy granting one or more other users authorization to access personal data.

10. The apparatus of claim 9, wherein the apparatus is further configured to at least:
wherein the generate the re-encrypted first and second secret keys and the prepare the second re-encryption key for transmission occur in accordance with the access control policy.

11. A method comprising:
generating a pseudonym of personal data of a user using a first private key;
encrypting a unique identifier of the user using a second private key;
preparing the pseudonym and the encrypted unique identifier for transmission to a remote apparatus for storing the personal data in a database under the pseudonym, the personal data indexed by the encrypted unique identifier, the first and second secret keys being known to one or more other users authorized to access the personal data, and the first and second secret keys being unknown to the remote apparatus,
wherein the generating the pseudonym, the encrypting the identifier, and the preparing the pseudonym and the encrypted unique identifier for transmission are performed by at least one processor; and
prepare an access control policy for transmission to a second apparatus, the access control policy grants the one or more other users authorization to access the personal data.

12. The method of claim 11, wherein the generating the pseudonym of the personal data comprises:
applying a hash function to the personal data using the second secret key.

13. The method of claim 11, wherein the encrypting the identifier comprises:
encrypting the identifier according to a chosen-plaintext attack-secure symmetric encryption technique.

14. The method of claim 11, further comprising:
receiving a public key of the second apparatus;
encrypting the first and second secret keys using the public key of the second apparatus; and
preparing the encrypted first and second secret keys for transmission to the second apparatus for generating and transmitting to an authorized user re-encrypted first and second secret keys that have been re-encrypted using a re-encryption key that has been generated using a public key of an authorized user and the public key and a private key of the second apparatus.

15. The method of claim 14,
wherein the access control policy for transmission to the second apparatus is for generating and transmitting to the authorized user the re-encrypted keys in accordance with the access control policy.

16. A method comprising:
receiving a pseudonym and an encrypted identifier at an apparatus, the pseudonym being of personal data of a user having a unique identifier, the pseudonym having been generated using a first secret key, and the encrypted identifier having been generated by encrypting the identifier using a second secret key, the first and second secret keys being known to one or more other users authorized to access the personal data, and the first and second secret keys being unknown to the apparatus;
providing for storage of the personal data in a database under the pseudonym, the personal data indexed by the encrypted identifier,
wherein the receiving the pseudonym and the encrypted identifier and the providing for storage of the personal data are performed by at least one processor; and
receive an access control policy for transmission to a second apparatus, the access control policy grants the one or more other users authorization to access the personal data.

17. The method of claim 16, further comprising:
receiving a query for the personal data from an authorized user, the query including the pseudonym and the encrypted identifier both having been generated by the authorized user;
retrieving the personal data from the database based on the pseudonym and the encrypted identifier; and
preparing the personal data for transmission to the authorized user.

18. The method of claim 17, wherein the receiving the pseudonym and the encrypted identifier comprises receiving the pseudonym and the encrypted identifier for a plurality of users, wherein the providing for storage of the personal data comprises providing for storage of the personal data in the database under the respective pseudonyms,
wherein the receiving the query comprises receiving the query for the personal data of some of the users, the query including the pseudonyms and the encrypted identifiers of the respective users, all of the pseudonyms and encrypted identifiers having been generated by the authorized user.

* * * * *